US007323973B1

(12) United States Patent
Ceglia et al.

(10) Patent No.: US 7,323,973 B1
(45) Date of Patent: Jan. 29, 2008

(54) MULTIPLEXED TTY SIGNALING FOR TELEMATICS

(76) Inventors: Michael J. Ceglia, 1008 Abington Rd., Cherry Hill, NJ (US) 08034; S. Robert Miller, 26307 Clarkston Dr., Bonita Springs, FL (US) 34135

( * ) Notice: Subject to any disclaimer, the term of this patent is extended or adjusted under 35 U.S.C. 154(b) by 210 days.

(21) Appl. No.: 11/331,617

(22) Filed: Jan. 13, 2006

Related U.S. Application Data

(60) Provisional application No. 60/704,632, filed on Jul. 29, 2005.

(51) Int. Cl.
*B60Q 1/00* (2006.01)

(52) U.S. Cl. ...................... 340/436; 455/99; 455/569.2

(58) Field of Classification Search ................ 340/436; 379/52; 455/99, 414.1, 569.2, 575.9
See application file for complete search history.

(56) References Cited

U.S. PATENT DOCUMENTS

| | | | | |
|---|---|---|---|---|
| 5,815,550 | A | 9/1998 | Miller | |
| 5,896,565 | A | 4/1999 | Miller | |
| 6,225,944 | B1 | 5/2001 | Hayes | |
| 6,366,646 | B1 | 4/2002 | Miller | |
| 6,516,198 | B1 | 2/2003 | Tendler | |
| 6,983,171 | B2 * | 1/2006 | Van Bosch et al. | 379/52 |
| 2005/0261035 | A1 * | 11/2005 | Groskreutz et al. | 455/575.9 |
| 2005/0273211 | A1 * | 12/2005 | McGarry et al. | 701/1 |
| 2005/0277440 | A1 * | 12/2005 | Van Bosch et al. | 379/52 |
| 2006/0030298 | A1 * | 2/2006 | Burton et al. | 455/466 |
| 2007/0167200 | A1 * | 7/2007 | Wong et al. | 455/575.9 |

* cited by examiner

*Primary Examiner*—John Tweel, Jr.
(74) *Attorney, Agent, or Firm*—Norman E. Lehrer

(57) ABSTRACT

In response to a triggering event at a location such as a vehicle that has crashed a telematics system initiates a telecommunications call via telecommunications link 8 to PTN 10, through which it is routed to local 9-1-1 system 14 and thereby to local PSAP 18. Telematics system 2 waits, 26 (N), for local PSAP 18 to respond, 26 (Y), then exchanges ACN data with it per TTY protocols, 28. The PSAP then sends a command code back to the vehicle or other location to allow for voice communications with a person at the location. Other functions such as shutting the vehicle engine off can also be controlled by PSAP.

21 Claims, 4 Drawing Sheets

MULTIPLEXED TTY SIGNALING FOR TELEMATICS

CROSS-REFERENCE TO RELATED APPLICATIONS

This application claims the benefit of U.S. Provisional Patent Application Ser. No. 60/704,632 filed Jul. 29, 2005.

FIELD OF THE INVENTION

This invention relates to the sending and receiving of data and control signals between a telematics system and an emergency response facility via the public telecommunications network.

BACKGROUND OF THE INVENTION

Each year, there are about 42,000 fatalities from motor vehicle traffic collisions in the United States. In such cases, more lives are saved when emergency personnel are able to determine in advance the probable nature and severity of the injuries, take with them the right resources for treating those particular injuries, and more quickly locate and reach the scene of the crash.

Currently, more and more vehicles are being equipped with telematics systems, incorporating ACN capabilities. Such systems are capable of detecting when the host vehicle is involved in a collision. As a few examples of this capability, the data processing means and sensors of a vehicular telematics system can detect: the number of passengers in the vehicle; the deployment of an airbag; velocity of the vehicle just before impact; excessive rate of reduction in velocity (termed delta-v in the industry); direction of the collision; and inversion of the vehicle.

A vehicular telematics system is equipped with cellular telephone capabilities. Consequently, upon detecting one or more such events, it is capable of automatically dialing a telephone number, and summoning aid for the vehicle's occupants, despite the fact that the occupants may be incoherent or unconscious. Obviously, such a system has enormous potential for reducing the loss of life and human tissue/organs resulting from vehicular collisions.

Such vehicular telematics systems are also equipped with geographic locational devices, typically incorporating Global Positioning System (GPS) technology and capabilities. Consequently, when a vehicular collision is detected by its telematics system, considerable information is available that can be critically helpful to emergency responders, including such items as: the location of the vehicle; the number of passengers in the vehicle; whether or not airbags were deployed; velocity of the vehicle just before impact; delta-v during the actual collision, indicating G-forces exerted on the occupants; the direction of the collision (front, side, rear, etc.); and whether or not the vehicle is inverted.

All such items give a valuable preview of the resources that will be needed when emergency responders arrive on the scene . . . and, most importantly, where that scene is located.

Presently, the initial call for assistance when there has been a collision is typically directed to a Telematics Service Provider, and the vehicle's telematics system data is uploaded to that Telematics Service Provider. It is paramount to the conduction of a Telematics Service Provider's business that it be capable of receiving and processing the data uploaded from a vehicle's telematics system. Consequently, Telematics Service Providers are invariably equipped to do so.

If, in accordance with predefined protocols, the Telematics Service Provider's call taker determines that a 9-1-1 condition exists, the call taker attempts to conference the call with (the Telematics Service Provider's determination of) the vehicle's Local PSAP. Typically, it does so via 10-digit phone number over the standard nationwide PTN. There are many things about this process that are worrisome to the 9-1-1 community.

Here are some examples. Typically, Telematics Service Providers are very regionalized. Generally, only one or two of a Telematics Service Provider's Call Centers service the entire nation. Consequently, the initial call to a Telematics Service Provider for emergency assistance must link up across the nation's long distance network. Problems may be encountered in doing so. During busy periods, a call may not go through, but may be routed to a message center. When attempting to conference with a vehicle's Local PSAP, the Telematics Service Provider's information may not identify the correct PSAP or its phone number, and the call may be misdirected. Assuming the conferencing call is correctly directed, such a call comes into the PSAP on an administrative line, not on a 9-1-1 line. As a consequence, it is queued up behind 9-1-1 calls currently being processed. During a busy 9-1-1 call period, administrative calls may not be answered for quite some time . . . perhaps not at all.

Consequently, it is preferred that such calls be made directly into the local 9-1-1 network, bypassing the Telematics Service Provider and directly dialing 9-1-1 from the vehicle, thereby eliminating all such potential problems about which the 9-1-1 community is concerned.

However, dialing directly into the 9-1-1 network also presents problems. Special equipment, telecommunications lines, and software are required to receive and process data uploaded from a vehicle's telematics system via current methods. PSAPs are not so equipped. Consequently, when such a call is received and the vehicle's telematics system uploads its data, the PSAP call taker is unable to receive and process it. Worse, if the vehicle's occupants are unconscious or incoherent, the call taker will answer a silent line.

As has been discussed, it is of critical importance that a call taker be able to receive/obtain ACN data describing collision conditions. However, it is also of considerable importance for the call taker to be able to do so while maintaining voice contact with the occupants of the vehicle. Voice contact can be invaluable in evaluating the severity of injury to the vehicle's occupants; it assures the injured that help is on the way; and it assists the call taker in predetermining resources that may be needed by responders upon arrival at the scene of the accident . . . even a lack of response from the occupants is meaningful information. It is a prime requisite of the 9-1-1 sector that voice contact be maintained with a distressed caller until help arrives.

It is also of importance that a call taker be able to execute certain control command functions over the remote crashed vehicle. A couple of examples include: unlock the vehicle's doors; and shut off the ignition. Such remote command functions can prevent escalating complications from creating problems that could have been totally avoided.

It is essential to the Nation's 9-1-1 system that the system be ubiquitously compatible. What works when 9-1-1 is dialed in Pennsylvania must also work when 9-1-1 is dialed in California . . . or Michigan, etc. There are more than 6,500 PSAPs in the United States. Equipping all of the nation's PSAPs to be capable of receiving and processing uploaded ACN data would be prohibitively expensive, and it seems unlikely it will happen.

Consequently, we continue to live with a system and methods our emergency responders consider potentially problematic.

SUMMARY OF THE INVENTION

In 1990, the Americans with Disabilities Act (ADA) was signed into law. The Act prohibits discrimination against people with disabilities in employment (Title I), in public services (Title II), in public accommodations (Title III) and in telecommunications (Title IV). Title IV is being enforced to require that all PSAPs must be equipped with TTY equipment in order to be capable of telecommunicating with hearing and speech impaired persons. Consequently, all PSAPs must already be equipped for TTY telecommunications, having been required by law to be so since 1990.

The problem described previously can be resolved in part by configuring ACN-capable vehicles to transmit telematics data in TTY format when transferring data to a PSAP subsequent to dialing 9-1-1 for emergency assistance. Essentially, this change requires no additional hardware in a telematics system. It basically requires that the necessary code be included in the firmware of the telematics system's data processing means, and doing so represents an insignificant cost.

Since the Nation's PSAPs are already TTY capable, all necessary information can be transferred directly from a vehicle's telematics system to any PSAP in the nation with no changes or additions required in the operation or equipment of those PSAPs.

Nevertheless, this solution, in itself, is not wholly satisfactory. Simultaneous voice and TTY signals on the same line would mutually conflict: TTY signals would be compromised, laden with errors; and voice conversation would be rendered difficult if not impossible. Consequently, voice and TTY signals are not typically sent simultaneously.

A typical TTY call begins with the sending of Baudot bit frequencies (1400 and 1800 Hz), comprising a message precursor. The exact content of this message precursor is unimportant, and no formal standard exists for it; however, the presence of Baudot frequencies in the signals is distinctive and easily identifiable, both by the human ear and by automated detection devices. Recognition typically takes 1 to 4 seconds, whereupon the receiving terminal is placed in its TTY Mode, either by a human call taker or by an automated detection device. In this mode, voice conversation is automatically precluded by the receiving terminal to prevent interference with the TTY signals.

Digital data, arriving at a PSAP via TTY signaling, can be read off the screen immediately as it's arriving. Consequently, there is no perceptual delay in the receipt and comprehension of the information being delivered. TTY signaling proceeds at a rate of a little over 6 characters per second. That's about a word and a half per second, which is just about the average rate of reading comprehension for most people. In other words, the data comes in just about as quickly as it can be read and absorbed by the average person. Nevertheless, at that rate a typical TTY message, delivering no more than a simple locational message, requires 7+ seconds to be received and comprehended in its entirety (comprising at least 40 characters to announce itself, format its display on the receiving screen, and incorporate latitude and longitude coordinates of appropriate resolution). If additional supporting factors are included, such as altitude, uncertainty estimate, and GPS signal confidence, elapsed time for message comprehension can increase to 12+ seconds.

When the PSAP wants to switch to Voice Mode, the call taker can send a TTY command back to the ACN system in the vehicle, and both will switch to Voice Mode. In this mode, data transfer is automatically precluded to prevent interference with the voice communication and vice versa. The process of commanding/switching to Voice Mode will take another 2+ seconds. In short, under the best of all possible conditions, and comprising the simplest of location information, it will take a minimum of 9+ seconds before voice contact can be made with the vehicle to attempt conversation with its occupants. More typically, it will actually take longer . . . at least twice that . . . probably in excess of 18 seconds.

In other words, even though the message arrives as quickly as human comprehension allows, delivery must be completed for complete comprehension and that means delaying voice contact. Generally, even delays of only a few seconds are considered very undesirable by the 9-1-1 community. Establishing uninterrupted voice contact with a distressed caller as quickly as possible is considered a major factor in 9-1-1 call processing.

Generally, the telephony voice band is typically considered to encompass a range of about 300 to 3500 Hz. If that band is divided into separate voice and data channels via frequency division multiplexing, voice and data can simultaneously be sent back-and-forth in-band without interfering with each other. Frequency division multiplexing permits such separation. To accomplish this, a specific frequency band is assigned to the data channel, and all other frequencies in the telephony band are assigned to the voice channel.

Complementing TTY signaling with multiplexing to transfer ACN data provides an ideal solution to the problem. Conventional TTY signaling is used to initiate ACN contact with 9-1-1 facilities, via which method any existing PSAP can receive and display the ACN information transmitted. If/when a PSAP upgrades its equipment to enable multiplexing and automated detection of ACN data on the line, such a PSAP can switch to the multiplexing mode in less than 1 second, whereupon it can immediately activate voice communication while simultaneously receiving ACN data on the data channel. Thus, such PSAPs can start to receive data and can initiate voice contact with the occupants of a crashed vehicle within 1 second of answering an incoming ACN call.

Further, if a PSAP has upgraded its equipment to be able to communicate in multiplex mode, there is no reason why the same upgrade cannot also switch the communications protocol. As an example, Baudot signaling might still be used, but the Baud rate increased to facilitate more rapid data transfer.

In addition to sending commands to control communication modes (i.e., voice vs. TTY and normal-TTY vs. multiplex-TTY), the PSAP is given the ability to send other commands to a vehicle's telematics system, enabling for the first time direct PSAP control of vehicular functions, such as unlocking the vehicle's doors, and shutting off its engine.

If the ACN systems in vehicles are designed to accommodate these processes now, they need never be changed to permit multiplexing when any PSAP decides to upgrade to it. A simple command from the PSAP will force the ACN system into the multiplex mode it is already prepared to handle.

Consequently, any and all existing PSAPs are already inherently prepared/able to receive ACN data via TTY signaling. With the implementation in ACN systems of the capabilities described, existing PSAPs will be inherently empowered with the ability to upgrade to more sophisticated, more efficacious data transfer methods . . . and to do so at their own paces without affecting third parties or other in-place systems.

Thus, as has already been stated, since the nation's PSAPs are already TTY capable, all necessary information can be transferred directly from a vehicle's telematics system to any PSAP in the nation as is . . . i.e., requiring no changes or additions to the operation or equipment of those PSAPs. If/when a PSAP facility upgrades its equipment to permit multiplexing, simultaneous voice and data communications are made possible, and data communications can be made at increased Baud rates. In addition, a migration path is inherent in the methodology to permit the least sophisticated PSAP to upgrade to multiplexing at its own pace. To do so, it simply needs to upgrade its own equipment without any changes to the infrastructure (i.e. the existing PTN and existing vehicular telematics systems).

Hence, the direct dialing of 9-1-1 by a vehicle's telematics system is thereby made completely feasible and desirable, and the associated concerns of the Nation's 9-1-1 community are eliminated.

BRIEF DESCRIPTION OF THE DRAWINGS

For the purpose of illustrating the invention, there is shown in the accompanying drawings a form which is presently preferred; it being understood that the invention is not intended to be limited to the precise arrangements and instrumentalities shown.

DETAILED DESCRIPTION OF THE PREFERRED EMBODIMENT

Figure 1:
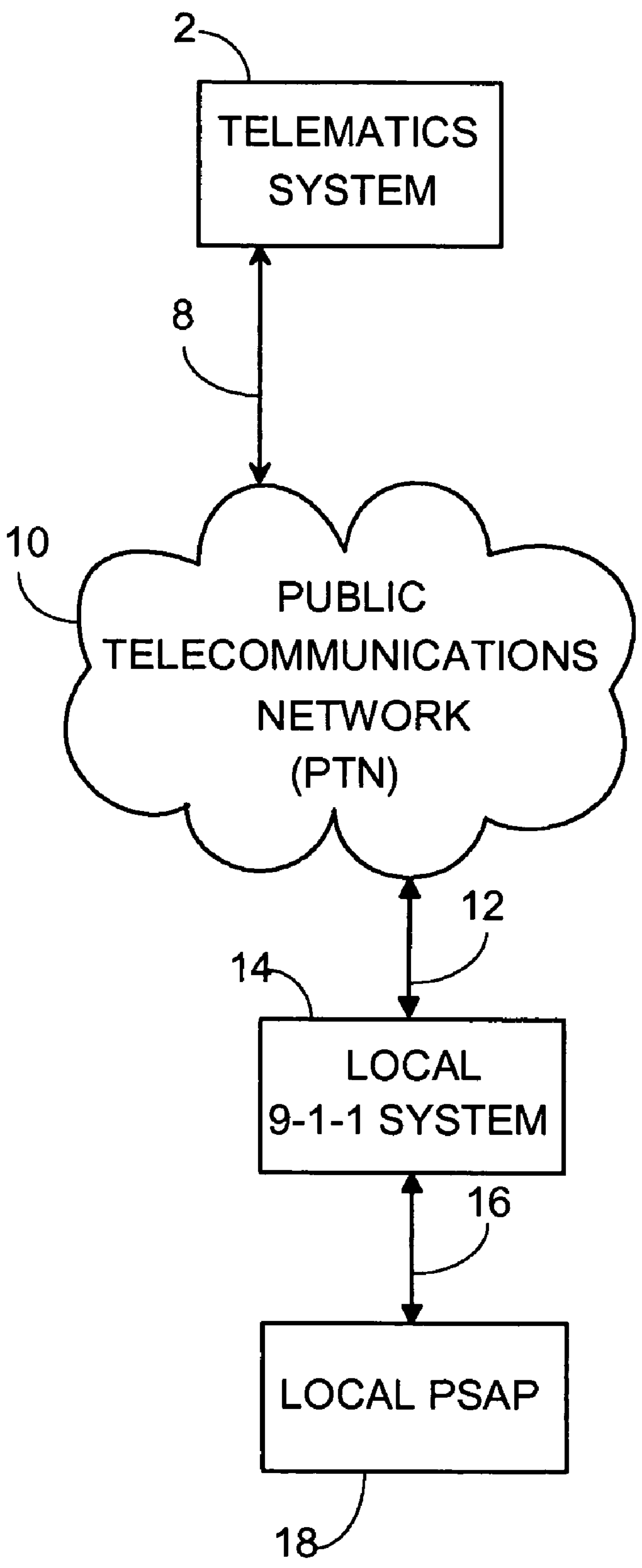
FIG. 1 (Prior Art)
FIG. 1 is a schematic representation of a telematics system of the prior art.

Referring to FIG. 1, in response to a triggering event, Telematics System 2 initiates a telecommunications call via telecommunications link 8 and PTN 10, through which it is routed to Local 9-1-1 System 14 and thereby to Local PSAP 18 via telecommunications links 12 and 16. This is prior art, and is not a claim of this invention.

Figure 2:
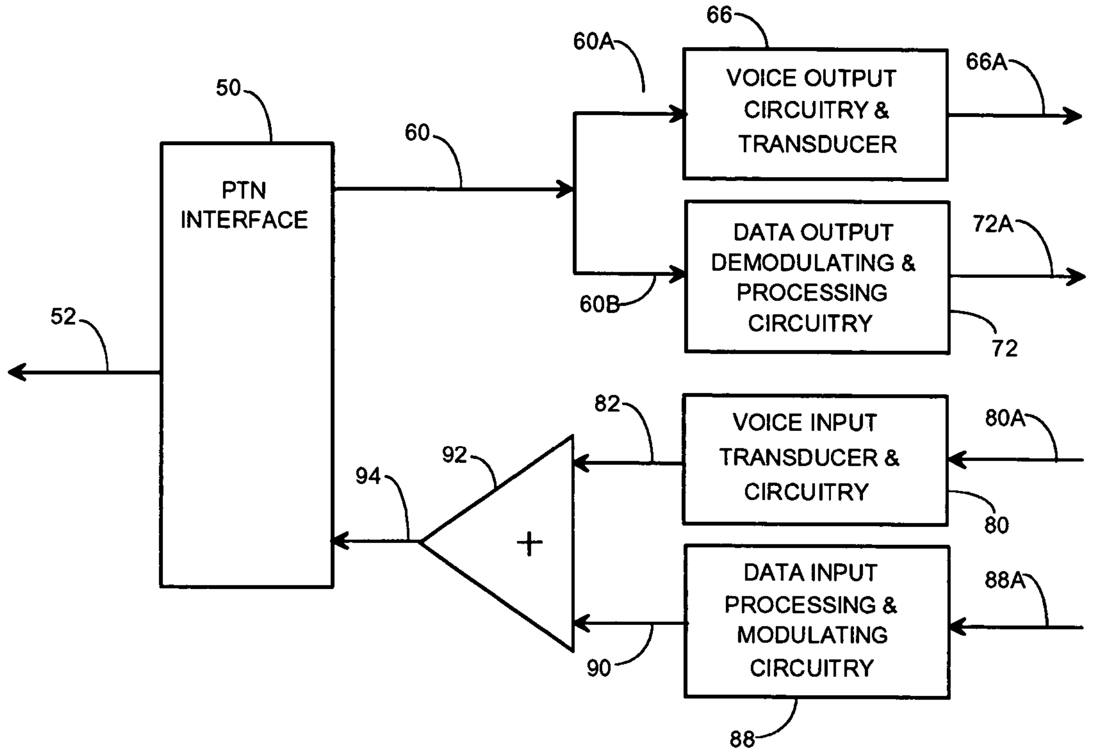
FIG. 2 (Prior Art)
FIG. 2 is a simplified generic block diagram depicting the typical functions implemented in circuitry, and/or software/firmware-emulated circuitry, used in prior art TTY devices.

FIG. 2 is a simplified generic block diagram depicting the typical functions implemented in circuitry, and/or software/firmware-emulated circuitry, used in TTY devices. This, too, is prior art, and is not a claim of this invention. PSAP 18 is already so equipped. In this embodiment, Telematics System 2 is also so equipped, enabling it to communicate in TTY Mode.

Referring to FIG. 2, telecommunications link 52 connects the TTY functions to PTN 10, and terminates in PTN Interface 50, thereby interfacing with receive and send signals on paths 60 and 94, respectively. Incoming signal 60, ultimately from the other party's sending path 94, is split into paths 60A and 60B, respectively. Path 60A routes the signals to Voice Output Circuitry & Transducer 66, thereby producing sound output 66A. Path 60B routes the signals to Data Output Demodulating & Processing Circuitry 72, thereby producing digital data output 72A.

Send signal 94, ultimately targeted for the other party's receive path 60, is the mixed output of summing amplifier 92, mixing/summing signals from paths 82 and 90. Path 82 carries voice signals from Voice Input Transducer & Circuitry 80, which processes incoming voice 80A. Path 90 carries modulated digital data signals from Data Input Processing & Modulating Circuitry 88, which processes incoming digital data signals 88A.

Figure 3:
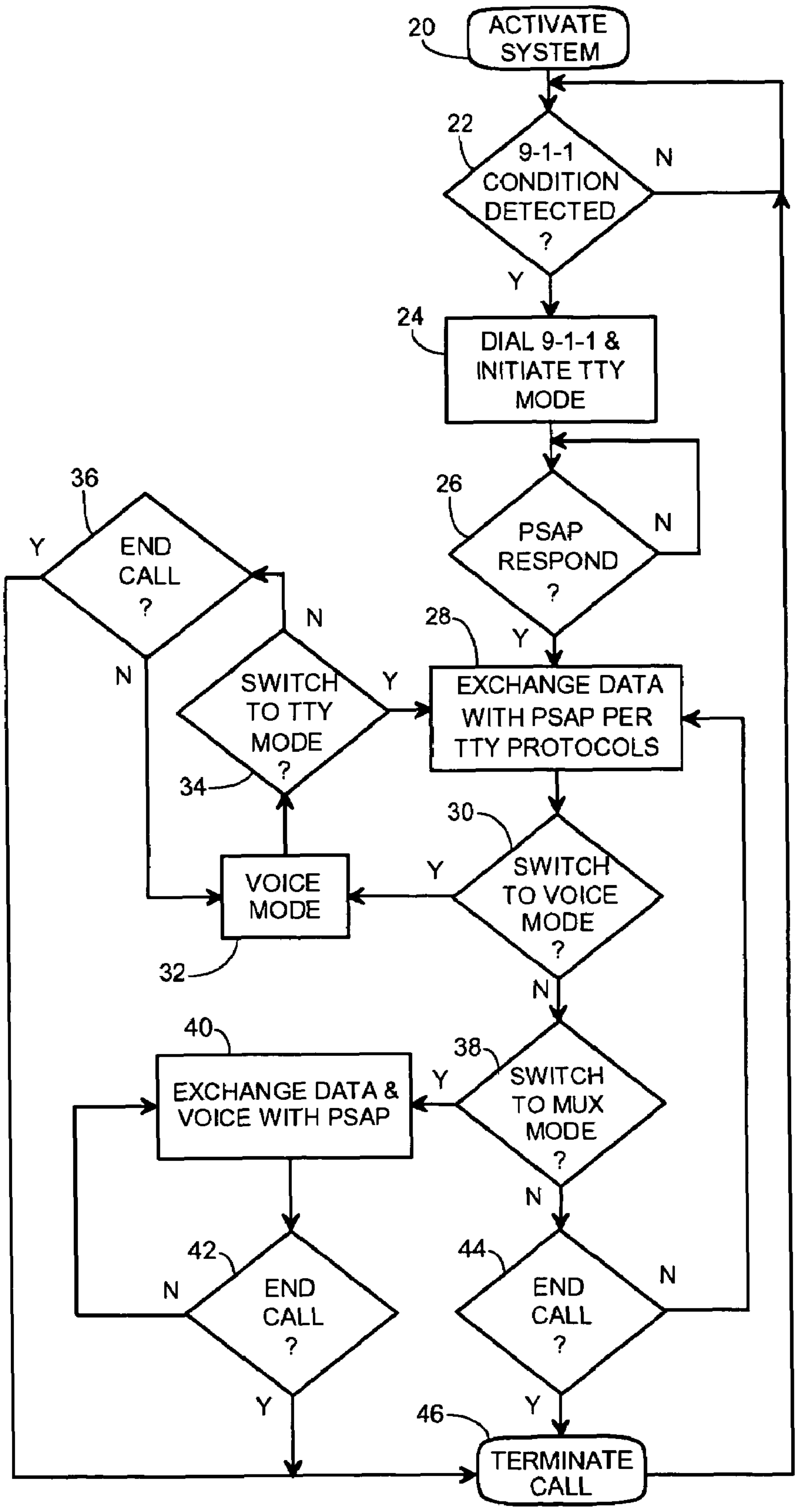
FIG. 3 is a schematic representation of a telematics system showing some of the features of the present invention.

With reference to FIG. 3, whenever Telematics System 2 is activated, 20, it continually monitors, 22 (N), for a 9-1-1 condition. If a 9-1-1 condition is detected, 22 (Y), Telematics System 2 implements a 9-1-1 call, employing the PTN telecommunications capabilities of Telematics System 2, and initiates TTY protocols, 24. Telematics System 2 next waits, 26 (N), for Local PSAP 18 to respond, 26 (Y), then exchanges data with it per TTY protocols, 28. PSAP response of 26 may take a variety of forms. Here are a few examples: a simple ACK (acknowledgement) signal; a specific command signal to proceed; and/or a simple timeout, after which Telematics Systems 2 automatically begins exchanging data with Local PSAP 18.

At any time during the call, predetermined command codes transmitted from Local PSAP 18 cause Telematics System 2 to switch between voice and TTY modes, steps 28 through 36. Similarly, call termination is the result of a command code transmitted from Local PSAP 18 to Telematics System 2, steps 36(Y), 42(Y), and 44(Y). In general, such predetermined codes also give Local PSAP 18 the ability to directly control functions local to Telematics System 2, such as unlocking a vehicle's doors or turning off its engine. A predetermined code or code set is used to do so. Examples of such a code set might be: "stst" to specify a switch to voice (Talk) mode; and "sese" to shut down a vehicle's engine. Telematics System 2 constantly monitors to detect such codes.

In the case of vehicular systems, Telematics System 2 transmits ACN data in TTY mode to Local PSAP 18.

In addition, upon upgrading its equipment to incorporate multiplexing capabilities, Local PSAP 18 can send a predetermined code to Telematics System 2, causing it (and itself) to switch into MUX Mode, 38, in which mode voice and data are then exchanged simultaneously, 40, between Local PSAP 18 and Telematics System 2 until the call is terminated, 42(Y) and 46.

To minimize the modulating, demodulating and multiplex/filter circuitry required in the MUX Mode by Telematics System 2 and by Local PSAP 18, a single frequency of 1400 Hz. is used for all data channel signals. Using a single frequency also narrows the bandwidth that must be preempted from the voice channel for the data channel, thereby minimizing voice channel distortion.

1400 Hz. is one of the two frequencies used in TTY signaling. The other is 1800 Hz. In the mark/space terms of TTY signaling, the 1400 Hz. signal normally identifies the mark state. The mark state defines the stop bit and the logical 1's in the data bit stream. The 1800 Hz. signal normally identifies the space state. The space state defines the start bit and the logical 0's in the data bit stream.

The no-signal condition defaults to the marking state. Consequently, there is no difference between a mark state defined by a no-signal condition and a mark state defined by an active signal. Therefore, for the purposes of this embodiment, stop bits, logical 1 bits, and a mark state are all adequately defined by the no-signal condition, rendering it unnecessary to represent the mark state by an active signal.

As a result, the 1800 Hz. tone is not used when multiplexing, and the 1400 Hz. tone is used to represent the space state instead of the mark state it normally represents in TTY communications. The reason for this role reversal can be gleaned from a 2005 paper by Meyer Sound Laboratories, Inc., entitled “Factors That Affect Intelligibility in Sound Systems”. The paper states that the two “heavy” voice bands are 135-400 Hz. (fundamental range) and 1800-2500 Hz. (strongest consonant range). In order to infringe as little as possible on the human speech consonant range, it is more advisable to use 1400 Hz. for data signals than 1800 Hz.

Consequently, when multiplexing, 1400 Hz. defines the space state, the 1800 Hz. frequency is not used, and the mark state is defined by the no-signal condition.

Figure 4:
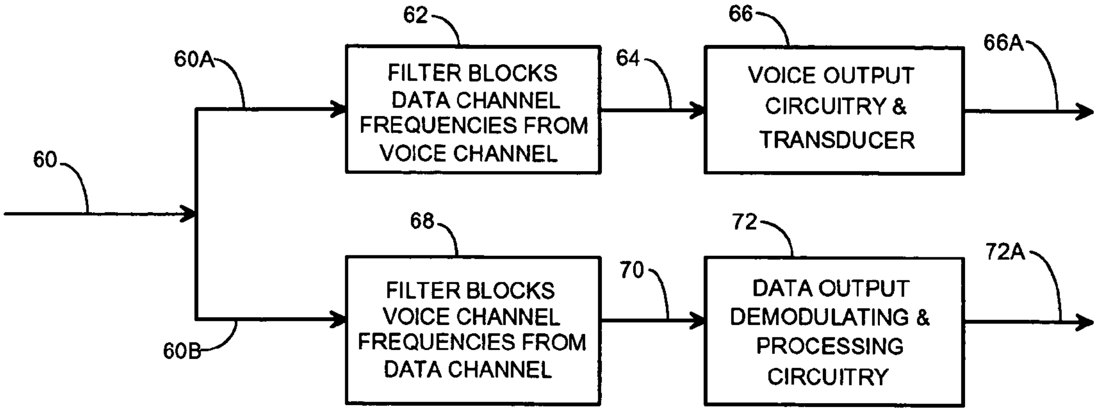
FIG. 4 is a simplified block diagram depicting the insertion of multiplex filter functions into the receiving circuitry in a Telematics System and at Local PSAP in accordance with the present invention.

With reference to FIG. 4, there is a simplified block diagram depicting the insertion of multiplex filter functions into the receiving circuitry in Telematics System 2 and at Local PSAP 18.

Figure 5:
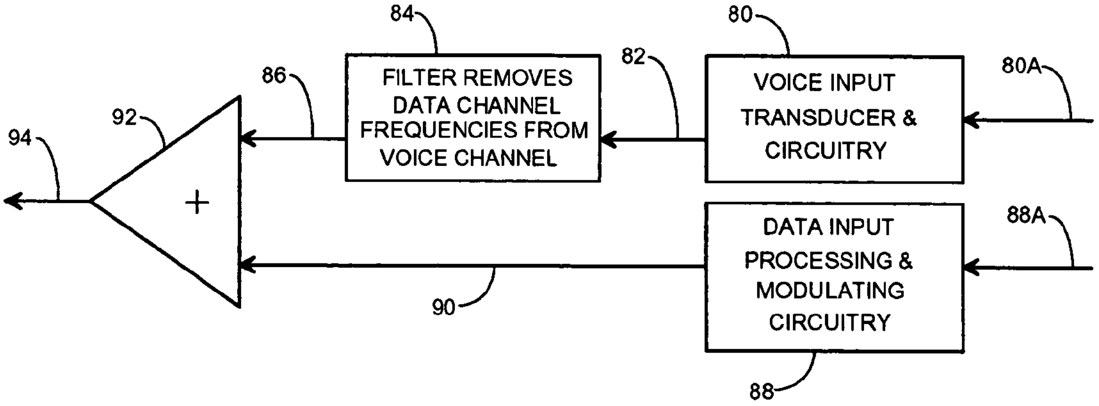
FIG. 5 is a simplified block diagram depicting the insertion of multiplex filter functions into the sending circuitry in a Telematics System and at Local PSAP in accordance with the present invention.

As previously explained, incoming signal 60 comprises mixed/combined data channel and voice channel signal frequencies. Incoming signal 60, ultimately from the other party’s sending circuitry, depicted as output 94 in FIG. 5, is split into paths 60A and 60B, respectively. In this case, paths 60A and 60B are then routed to filters 62 and 68, respectively.

Filter 62 comprises a conventional band reject or slot filter that strips data channel frequencies from the signals being passed via path 64 to voice output circuitry and transducer 66, producing sound output 66A. As a result, data channel signals do not interfere with voice channel signals, and are not present/audible in sound output 66A.

Filter 68 comprises a conventional band pass filter that passes only the data channel (1400 Hz.) signal, thereby stripping all voice channel signal frequencies from path 70 to data output demodulating and processing circuitry 72, producing digital data output 72A. As a result, voice channel signals do not interfere with the processing of data channel signals demodulated onto output 72A.

FIG. 5 is a simplified block diagram depicting the insertion of multiplex filter functions into the sending circuitry in Telematics System 2 and at Local PSAP 18.

Containing all voice frequencies, including those reserved for the data channel, voice input 80A enters voice input transducer and circuitry 80, where it is processed and passed to filter 84 via path 82. Filter 84 comprises a conventional slot, or band reject, filter that strips the data channel frequency band from the signals being passed via path 86 to summing amplifier 92.

Containing only data, data input 88A enters data input processing and modulating circuitry 88, where it is processed, modulated, and passed via path 90 to summing amplifier 92, containing only the data signal frequency.

Summing amplifier 92 mixes/combines the data channel signal from path 90 with the filtered voice channel signal from path 86, and transmits the mixed/combined voice channel and data channel signals on output 94 to the other party’s incoming signal 60, depicted in FIG. 4.

Essentially, only the preferred embodiment of this invention has been described. Various other embodiments and ramifications are possible within the scope of this invention. Although described herein primarily in terms of its applicability to vehicular telematics systems, this invention can also be applied to any telematics system that must detect a 9-1-1 condition and transmit associated data to a Local PSAP.

For example, Telematics System 2 might be an integral part of a handheld cell phone, and the triggering event might be the manual dialing of 9-1-1 on its keypad sensors.

Further, the 9-1-1 telecommunication link need not initialize into the TTY mode. It might initialize into voice mode, as determined by the programming and configuration of Telematics System 2, then later be switched into the TTY mode.

In another implementation, Telematics System 2 might be a premises alarm panel, the triggering event being the activation of a motion sensor, and the 9-1-1 call placed via conventional PTN landline.

Note, as well, that once communications have been established between Telematics System 2 and Local PSAP 18, and MUX Mode entry has been negotiated, 38Y, new communications protocols can also be initiated. Employing, and adhering to, standard TTY protocols is necessary in establishing initial contact with Local PSAP 18 to assure complete ubiquity and total current compatibility with any/all PSAPs. However, in the act of issuing a command to switch to MUX Mode, 38, Local PSAP 18 demonstrates that it has upgraded its equipment beyond simple TTY capabilities. Such upgrade can just as well incorporate enhanced communications capabilities as well as the ability to de/multiplex. As one example, switching to MUX Mode, 38, might include increasing the Baud rate to 150 Baud. Such standards would be negotiated by the ACN and 9-1-1 communities.

Although the preceding descriptions contain many specificities, they should not be construed as limiting the scope of this invention but as merely providing illustrations of some of the presently preferred embodiments of this invention. Various other embodiments and ramifications are possible within its scope, as indicated by the preceding examples. Thus, the scope of the invention should be determined by the appended claims and their legal equivalents rather than by the examples given.

GLOSSARY OF TERMS USED HEREIN

The term “9-1-1 condition” is intended to refer to a triggering event that comprises a need for 9-1-1 emergency assistance.

The acronym “ACN” is intended to refer to “Automatic Collision Notification”, a capability of in-vehicle telematics systems. An ACN system automatically detects and analyzes a probable vehicular collision, then reports it to authorities via wireless communications, providing information about the collision. Some examples of the provided information include: geographic location of the vehicle; whether or not the vehicle has rolled over; change in speed at the time of the collision; and the principal direction of the force of collision.

The term “automated event alarm” is intended to refer to any warning signal automatically triggered by a predefined event or series of events.

The terms “exchange data” and “data exchange” are intended to relate to the sending/receiving of digital data, including the sending/receiving of information and the sending/receiving of commands.

The term “emergency number” is intended to refer to that standardized, dialable telephone number, sometimes known as the universal emergency telephone number or occasionally as the emergency services number, that allows a caller to contact local emergency services for assistance. Many countries' public telephone networks have such a number, but it can and does differ from country to country. Typically, it is a three-digit number (though not always), so that it can be easily remembered and dialed quickly. Some countries have a different emergency number for each of the different emergency services, these often differ only by the last digit. In the United States, an act of Congress made 9-1-1 the single universal emergency telephone number for reaching all local emergency service providers.

The term "gathered data" is intended to refer to data collected by a telematics system from associated sensors.

The term "in-band" is intended to refer to the entire spectrum of frequencies (~300-3500 Hz.) normally communicated via the PTN.

The term "Local PSAP" is intended to refer to that PSAP to which a specific 9-1-1 call is routed by the local E9-1-1 system.

The term "MUX mode" is an acronym for "multiplex mode". The term is intended to refer to the frequency division of available bandwidth into a voice channel and a data channel to separate/isolate voice from data, thereby permitting simultaneous, non-interfering voice and data communications on the same communications link.

The acronym "PSAP" (pronounced PEE-sap) is intended to refer to "Public Safety Answering Point", a location where a 9-1-1 call is answered and processed.

The acronym "PTN" is intended to refer to the wired and wireless "Public Telecommunications Network".

The term "sensor" is intended to refer to any device providing data describing to a data processing means the state of that device and/or any data it may contain. Some examples include: air bag deployment detection devices; accelerometers; emergency assistance buttons; keypads; door switches; motion detectors; heat detectors; and GPS devices.

The term "stored data" is intended to refer to data stored in memory devices accessible to a system's data processing means.

The term "telematics" is intended to describe systems having data processing means and capable of automatically: monitoring and analyzing the states of sensors to which they are linked; initiating PTN telecommunication links in reaction to predefined conditions of those sensors; and automatically communicating stored and gathered data over the initiated telecommunications links. Applying existing technologies and means, this latter capability is easily expanded to include TTY telecommunications.

A "Telematics Service Provider" is intended to refer to any organization that monitors and processes incoming calls from vehicular telematics systems.

The term "triggering event" is intended to refer to the occurrence and detection of a predetermined state, state threshold, or state pattern of a sensor or set of sensors.

The acronym "TTY" is intended to describe devices, protocols, and systems used for two-way text conversation over the PTN. Such devices (with associated protocols) are also referred to as text telephones. The term TTY came into use in the U.S. because the technology was borrowed from the Teletypewriter industry. TTY devices and protocols are the primary tools used by speech or hearing impaired people for telephone conversation. The dominant TTY protocol is ANSI/TIA/EIA 825, "A 45.45 Baud FSK Modem"; however, other protocols are also used. Some examples include: TurboCode; HiSpeed; and Bell 103. The ITU/CCITT (the International Telecommunications Union, formerly the International Telegraph and Telephone Consultive Committee) has approved V.18, a standard that promotes universal design by incorporation of TTY into digital products. In addition to supporting 45.45 and 50 TTY Baud rates, it supports DTMF, EDT, V.21, and V.23 standards, which are used in Europe. V.18 implementation is unavailable in commercial format at the time of this presentation. The term TTY, as used herein, is intended to refer to any and all such devices and protocols used for text conversation over the PTN by speech or hearing impaired people.

The term "TTY mode" is intended to refer to communications conducted primarily, but not necessarily exclusively, via data transfer using TTY protocols.

The term "voice mode" is intended to refer to communications conducted primarily, but not necessarily exclusively, using the human voice.

We claim:

1. A telecommunications system for automatically providing collision notification information from a vehicle over a wireless public communications telephone network directly to a public safety answering point comprising:

- means within said vehicle for sensing a collision;
- means within said vehicle for gathering data relating to said collision;
- means within said vehicle for automatically and directly calling said public safety answering point in response to said sensing means sensing a collision;
- means for sending said data in TTY mode directly to said public safety answering point, and
- means located at the public safety answering point for sending a command code back to said vehicle to control a function at said vehicle.

2. The telecommunications system of claim 1 wherein said command code allows for said system to provide voice communications with occupants of said vehicle.

3. The telecommunications system of claim 2 further including multiplexing means for allowing substantially simultaneous voice and TTY communications between said vehicle and said public safety answering point.

4. The telecommunications system of claim 1 wherein said means for calling dials a three digit emergency number.

5. The telecommunications system of claim 4 wherein said emergency number is 9-1-1.

6. A telecommunications system for automatically providing automated event alarm information from a location over a public communications telephone network directly to a public safety answering point comprising:

- means at said location for sensing the existence of an automated event alarm situation;
- means at said location for gathering data relating to said automated event alarm;
- means at said location for automatically and directly calling said public safety answering point in response to said sensing means sensing an automated event alarm;
- means for sending said data in TTY mode directly to said public safety answering point, and
- means located at the public safety answering point for sending a command code back to said location to control a function at said location.

7. The telecommunications system of claim 6 wherein said command code allows for said system to provide voice communications with a person at said location.

8. The telecommunications system of claim 7 further including multiplexing means for allowing substantially simultaneous voice and TTY communications between said location and said public safety answering point.

9. The telecommunications system of claim 6 wherein said means for calling dials a three digit emergency number.

10. The telecommunications system of claim 9 wherein said emergency number is 9-1-1.

11. A telecommunications system for providing automated event alarm notification information from an automated event alarm monitoring system over a public communications telephone network to a public safety answering point comprising:

means associated with said automated event alarm monitoring system for sensing said automated event alarm;

means for gathering data relating to said automated event alarm;

means associated with said automated event alarm monitoring system for calling said public safety answering point in response to said sensing means sensing an automated event alarm;

means for sending said data in TTY mode directly to said public safety answering point, and means located at the public safety answering point for sending a command code back to said alarm monitoring system to control a function at said alarm monitoring system.

12. The telecommunications system of claim 11 wherein said command code allows for said system to provide voice communications with a person located in the vicinity of said alarm monitoring system.

13. The telecommunications system of claim 12 further including multiplexing means for allowing substantially simultaneous voice and TTY communications between said alarm monitoring system and said public safety answering point.

14. The telecommunications system of claim 11 wherein said means for calling dials a three digit emergency number.

15. The telecommunications system of claim 14 wherein said emergency number is 9-1-1.

16. A method for providing automated event alarm notification information from an automated event alarm monitoring system over a public communications telephone network to a public safety answering point comprising:

sensing an automated event alarm;

gathering data relating to said automated event alarm;

calling said public safety answering point in response to sensing said automated event alarm;

sending said data in TTY mode directly to said public safety answering point;

sending a command code from said public safety answering point back to said alarm monitoring system and controlling a function at said alarm monitoring system in response to said command code.

17. The method of claim 16 wherein said command code allows for said system to provide voice communications with a person located in the vicinity of said alarm monitoring system.

18. The method of claim 17 further including multiplexing means and wherein said command code allows for substantially simultaneous voice and TTY communications between said alarm monitoring system and said public safety answering point.

19. The method of claim 16 wherein said step of calling includes dialing a three digit emergency number.

20. The method of claim 19 wherein said emergency number dialed is 9-1-1.

21. The method of claim 16 wherein said step of sensing an automated event alarm senses the collision of a vehicle and wherein said step of gathering gathers data relating to said collision.

* * * * *